Jan. 27, 1959 C. B. COLLINS 2,871,330

SILICON CURRENT CONTROLLING DEVICES

Filed Dec. 22, 1954

Inventor:
Clifford B. Collins,
by Paul A. Frank
His Attorney.

2,871,330
Patented Jan. 27, 1959

2,871,330

SILICON CURRENT CONTROLLING DEVICES

Clifford Bruce Collins, Scotia, N. Y., assignor to General Electric Company, a corporation of New York Application December 22, 1954, Serial No. 476,910
10 Claims. (Cl. 201—63)

This invention relates to silicon electric current controlling devices and more particularly to silicon devices sensitive to heat and light.

One object of the invention is to provide silicon devices the resistivities of which are unusually thermosensitive over a range of temperatures from about −100° C. to 100° C., and yet having absolute magnitudes of resistivity over such temperature range which enable the devices conveniently to serve as thermosensitive control elements of electric circuits.

Another object of the invention is to provide silicon devices exhibiting unusually pronounced photoconductive properties; in other words, a high degree of change in resistivity level for different intensities of impinging light, and particularly infra-red light, over a large range of temperatures, particularly from 0° C. to −200° C. The absolute magnitudes of the range of resistivity change of these photosensitive silicon devices, when subjected to incident light at these low temperatures, enable the devices conveniently to serve as efficient photosensitive control elements for electric circuits and especially to serve as infra-red detectors for infra-red wavelengths as long as about 3 microns.

A further object of the invention is to provide silicon current control devices having high resistivity at normal operating temperatures.

In general, semiconductor current controlling devices in accord with the invention are provided in the form of a high purity silicon crystalline body impregnated with a trace of iron and having a pair of spaced connections thereto. The silicon body may be impregnated by the diffusion of iron within the body at an elevated temperature, for example, 1,000° C., but is preferably impregnated by addition of iron to a silicon melt from which an iron impregnated crystal is grown.

The term "trace of iron" is used herein to mean from $10^{12}$ to $2\times10^{14}$ atoms of iron per cubic centimeter of silicon. The term "high purity silicon" is used herein to mean silicon having less than $10^{14}$ atoms of uncompensated acceptor activator impurities per cubic centimeter of silicon, and corresponds to P-type silicon having a resistivity above 100 ohm centimeters at 25° C. The addition of iron to the high purity silicon greatly enhances the thermoconductive and photoconductive properties of the silicon body, and enables the provision of thermocontrol and photocontrol elements which are extremely sensitive to changes in temperature and light level. The addition of iron to the silicon additionally provides silicon bodies having higher resistivity than heretofore obtainable in silicon bodies at normal operating temperatures.

The novel features believed characteristic of the invention are set forth in the appended claims. The invention itself, however, together with further objects and advantages thereof, may best be understood by referring to the following description taken in connection with the accompanying drawing, in which:

Figure 1:
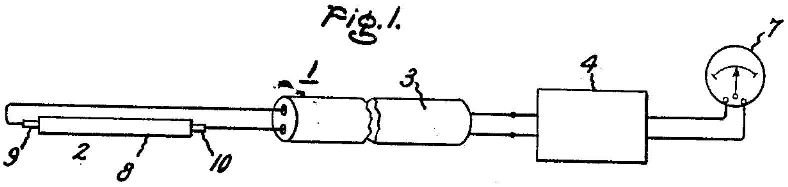
Fig. 1 illustrates a thermosensitive device constructed in accord with the invention.

In Fig. 1 a thermosensitive control or indicating device illustrative of one embodiment of the invention is indicated generally as 1. Thermosensitive device 1 comprises a thermoconductive element 2, a probe shaft 3 and a bridge and amplifier circuit 4 which may also contain a source of potential for causing an electric current to flow through thermoconductive body 2. In operation, an electric current is caused to flow through thermoconductive body 2. Bridge and amplifier circuit 4 is adjusted so that no voltage appears between the output terminals thereof. Null type current indicating meter 7 is connected across the output of bridge and amplifier circuit 4. By proper adjustment of variable resistances in bridge and amplifier circuit 4, meter 7 may be caused to indicate zero current for any preselected temperature within the range from −100° C. to 100° C. The face of meter 7 may then be calibrated to indicate temperature deviations from the preselected mean. Alternatively, meter 7 may be replaced by a load resistance and the potential drop through the load may be used to operate a suitable control circuit which becomes operative when thermoconductive element 2 indicates temperature deviations from a preselected mean.

Thermoconductive element 2 comprises a high purity P-type silicon crystalline bar 8 impregnated with a trace of iron, and a pair of low resistance connections 9 and 10 to opposite ends of bar 8. Silicon bar 8 is preferably monocrystalline and may conveniently be of the order of ½ inch long and ¹⁄₁₆ inch wide and thick. The silicon bar 8 is preferably substantially free of all electrically significant impurities other than iron. However, uncompensated acceptor impurities such as boron, indium or gallium to the extent of about $10^{14}$ atoms per cubic centimeter of such impurities, or less, corresponding to about 100 ohm centimeters, or higher, resistivity silicon at 25° C. may be present before the addition of iron. The iron is incorporated in the silicon in relatively minute amounts, preferably less than $2\times10^{14}$ atoms of iron per cubic centimeter of silicon.

Silicon bar 8 may be easily provided by extraction from a monocrystalline ingot grown by seed crystal withdrawal during solidification from a melt of high purity silicon material having a solidified resistivity above 100 ohm centimeters at 25° C., to which has been added from 0.001 to 0.1% by weight of pure iron. The seed crystal withdrawal method of growing single crystals of semiconductive materials is well known to the art and is described in detail in an article entitled "Preparation of Germanium Single Crystals," by Roth and Taylor, on page 1338, vol. 40, Number 11, Proceedings of the I. R. E., November 1952. Because of the low segregation coefficient of iron in silicon (approximately $10^{-5}$ to $10^{-6}$), less than $2\times10^{14}$ atoms per cubic centimeter of iron will be assimilated by the growing silicon ingot. Even additions of minute traces of iron corresponding, for example, to the presence of $2\times10^{13}$ atoms of iron per cubic centimeter of silicon appear to have pronounced effect and enhancement of the thermoconductive properties of the silicon material. In general, it may be stated that the greater the purity of the silicon in bar 8, the less the amount of iron that is necessary to produce the same enhancement of the thermoconductive properties and increased resistivity of the resultant crystal.

Contacts 9 and 10 preferably comprise an acceptor activator material, such as an alloy of gold and 1–5% of gallium or aluminum, or any metal or alloy which makes low resistance contact with P-type silicon and which may be fused to silicon bar 17 at about 650° C.

Figure 2:
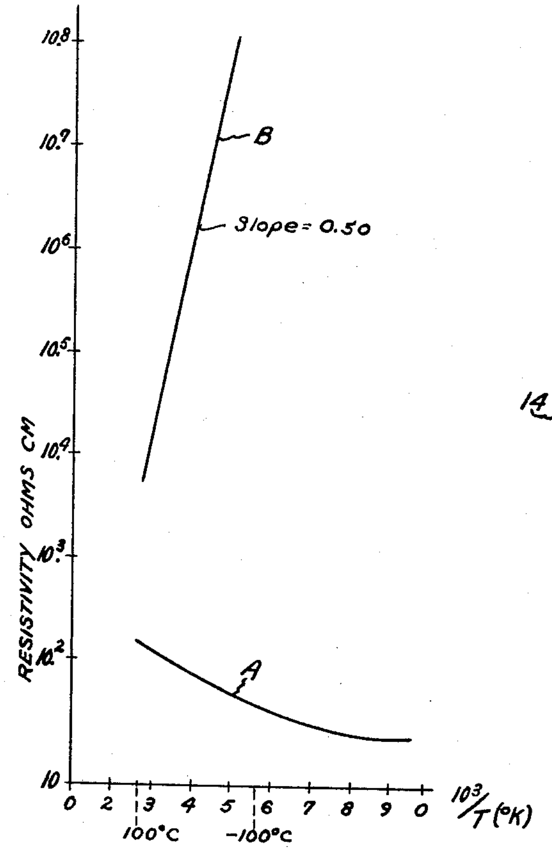
Fig. 2 is a group of curves, illustrating the improvement in the thermosensitivity of silicon bodies due to the presence of iron therein.

The enhancement of the thermoconductive properties of silicon bar 8 resulting from the impregnation thereof with iron is illustrated by the curves of Fig. 2. In Fig. 2, curve A is a plot of the resistivity versus temperature of a silicon bar extracted from an ingot grown from a melt of high purity P-type silicon. Curve B, on the other hand, is a plot of the resistivity versus temperature curve of a silicon bar extracted from an ingot grown from the same quality P-type silicon melt after approximately 10 milligrams of iron were added for each 10 grams of silicon in the melt. As can be seen from these curves, the P-type silicon bar extracted from the pure silicon ingot exhibits little change in resistivity over the temperature range from −100° C. to 100° C., while the sample extracted from the iron-impregnated ingot exhibits a very sharp increase in resistivity for decreases in temperature over this temperature range. As can be seen from the slope of curve B the resistivity of the iron impregnated silicon bar 17 varies from a few tenths megohm centimeters to 5,000 megohm centimeters in the temperature range from −100° C. to 100° C. The slope of curve B of Fig. 2 indicates an activation energy of 0.50 electron volts for P-type iron impregnated silicon. The iron induced impurity level responsible for this activation energy is close to the center of the forbidden band of silicon and causes the thermoconductive bodies of the invention to approach closely the maximum temperature dependence obtainable from silicon bodies.

The resistivity of the thermosensitive devices of the invention is determined from the activation energy of the iron impregnated silicon, and follows the expression $$\rho = 9.2 \times 10^{-4} e^{\frac{5.88 \times 10^3}{T}}$$

where $\rho$ is the resistivity in ohm centimeters and T is the absolute temperature in degrees Kelvin over the range from −100° C. to 100° C.

Such high temperature dependence causes thermoconductive bodies constructed according to the invention to be extremely sensitive to temperature changes. This range of resistivity change lends itself admirably to the control of electric currents. By selecting a load in the circuit of bar 8 having approximately the same order of resistance or impedance magnitude as that of silicon bar 8 over the range of temperatures to be measured or monitored by the thermoconductive device 2, the change in resistance of the thermoconductive device as a result of any change in temperature thereof immediately appears as a considerable change in current through the load. Devices such as thermoconductive body 10 are particularly useful, as the range of temperatures over which the thermoconductive properties are most pronounced encompasses room temperature and extends for at least 75 centigrade degrees above and below that point. Such devices, therefore, are highly thermosenstitive at the temperatures at which the need for such devices is greatest. In addition, the absolute magnitude of resistivity of such devices at normal operating temperatures is easily matched in impedance-matching circuits to secure optimum power transfer. For example, referring to curve B of Fig. 2, at room temperature (25° C.), the bulk resistivity of silicon bar 8 is of the order of 0.5 megohm centimeters.

Figure 3:
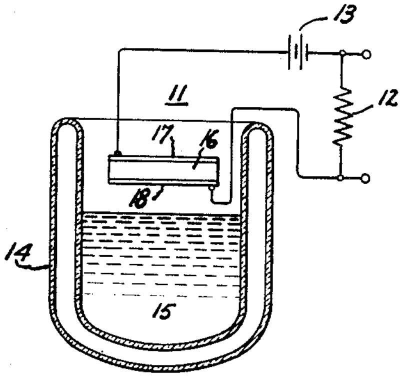
Fig. 3 illustrates a photosensitive device constructed in accord with the invention.

Referring now to Fig. 3, I have shown a photoconductive cell 11 embodying the invention and connected in a suitable electrical circuit comprising output resistor 12 and a battery 13. Photoconductive cell 11 may be maintained at any desirable temperature by immersion within an insulated vessel 14 containing a thermal fluid 15, such as liquid nitrogen, with a stable fixed temperature. Photoconductive cell 11 comprises a P-type silicon crystalline wafer 16 which may conveniently be a rectangular wafer ½ inch long and wide, and about 0.050 inch thick. The photoconductive device 11 includes electrodes 17 and 18 contacting the opposite major surfaces of the silicon wafer 16. The upper electrode 17 is conveniently made in the form of a ring in order that incident light rays will reach and activate the silicon wafer 16. The lower layer 18 may be any shape desired. Both electrodes 17 and 18 may comprise metals which make non-rectifying connection to silicon wafer 16. Electrodes 17 and 18 preferably make low resistance connection and may conveniently comprise layers of an acceptor activator, as for instance indium-gold alloys, gallium-gold alloys, or aluminum, that are subsequently fused with the surface of the silicon wafer 16 by a suitable application of heat.

Silicon wafer 16 comprises silicon impregnated with a trace of iron within the same limits as set forth above with relation to the silicon bar 8 of thermoconductive element 2. High purity silicon containing less than $10^{14}$ atoms of uncompensated acceptor activator impurities is used as the base silicon material and this silicon material is impregnated with from $10^{12}$ to $2 \times 10^{14}$ atoms of iron per cubic centimeter of the silicon. It is convenient to use P-type silicon having an initial resistivity of above 100 ohm centimeters at 25° C. as the base silicon material, and impregnate this starting material with the order of $10^{14}$ atoms of pure iron per cubic centimeter of silicon. This may be easily done by preparing a melt of the base silicon and adding from 5 to 10 milligrams of pure iron per 10 grams of silicon of the melt and then growing an ingot from the iron impregnated melt by seed crystal withdrawal therefrom. A wafer 16 cut from this grown ingot will then have the desired degree of iron impregnation.

This range of iron impregnation of high purity silicon gives optimum response to incident light of the long infrared wavelengths to approximately 3 microns.

The intensity of light necessary to bring about a marked change in resistivity of the photosensitive devices of the invention is not very great. For example, in the case of one sample being tested at the temperature of liquid nitrogen, the resistance of the body fell two orders of magnitude from the dark value under the light of a two-cell flashlight. More quantitatively, it has been determined experimentally that the photosensitive devices of the invention respond to light input energies as low as $10^{-9}$ watts.

While my invention has been described by a particular embodiment, it will be understood that many changes and modifications may be made by those skilled in the art without departing from the invention. Therefore, by the appended claims, I intend to cover all such changes and modifications.

What I claim as new and desire to secure by Letters Patent of the United States is:

1. A semiconductor current control member comprising a mono-crystalline body consisting essentially of high purity silicon impregnated with a trace of iron.

2. A semiconductor current control member comprising a monocrystalline body consisting essentially of high purity P-type silicon impregnated with from $10^{12}$ to $2 \times 10^{14}$ atoms of iron per cubic centimeter of silicon.

3. A semiconductor current control member comprising a monocrystalline body consisting essentially of high purity P-type silicon impregnated with from $10^{12}$ to $2 \times 10^{14}$ atoms of iron per cubic centimeter of silicon, the resistivity of said member having a temperature dependence of from −100° C. to 100° C. defined by the equation $$\rho = 9.2 \times 10^{-4} e^{\frac{5.88 \times 10^3}{T}}$$

where $\rho$=the resistivity of the member in ohm centimeters, and T=the absolute temperature of the body in degrees Kelvin.

4. An electric current control device comprising a monocrystalline body consisting essentially of high purity P-type silicon impregnated with an electrically significant trace of iron, and a pair of low resistance connections to spaced regions of said body.

5. An electric current control device comprising a monocrystalline body consisting essentially of P-type silicon impregnated with from $10^{12}$ to $2\times10^{14}$ atoms of iron per cubic centimeter of silicon and a pair of low resistance connections to spaced regions of said body, said body exhibiting a resistivity of the order of 0.5 megohm-centimeters at 25° C.

6. An electric current control device comprising a P-type monocrystalline body consisting essentially of high purity silicon having a resistivity of greater than 100 ohm centimeters at 25° C., impregnated with from $10^{12}$ to $2\times10^{14}$ atoms of iron per cubic centimeter, and a pair of electrical connections to spaced regions of said body.

7. An electric current control device comprising P-type monocrystalline body consisting essentially of high purity silicon having per cubic centimeter therein $10^{12}$ to $2\times10^{14}$ atoms of iron, a finite amount less than $10^{14}$ atoms of uncompensated acceptor activator elements for silicon, and a pair of electrical connections to spaced regions of said body, said body exhibiting a resistivity of the order of 0.5 megohm-centimeters at 25° C.

8. A photosensitive control device comprising a P-type monocrystalline body having a resistivity above 100 ohm centimeters at 25° C. and consisting essentially of high purity silicon impregnated with from $10^{12}$ to $10^{14}$ atoms of iron per cubic centimeter thereof and being substantially free of other uncompensated acceptor activator elements for silicon, said body exhibiting a substantial decrease in resistivity for a small increase in the intensity of incident light, and a pair of electrode connections to spaced regions of said body, said electrodes making low resistance connection with said body.

9. A semiconductor current control member comprising a monocrystalline body consisting essentially of P-type silicon having a finite excess of uncompensated acceptor activator impurities for silicon not exceeding $10^{14}$ atoms per cubic centimeter thereof impregnated with from $10^{12}$ to $2\times10^{14}$ atoms of iron per cubic centimeter of silicon, said member exhibiting a change in resistivity from approximately 0.01 megohm-centimeters at 100° C to over 100 megohm-centimeters at −100° C.

10. A semiconductor current control member comprising a P-type monocrystalline body consisting essentially of silicon having a finite excess of uncompensated acceptor activator impurities for silicon not exceeding $10^{14}$ atoms per cubic centimeter thereof impregnated with from $10^{12}$ to $2\times10^{14}$ atoms of iron per cubic centimeter of silicon, the resistivity of said member possessing a temperature-dependence from −100° C. to 100° C defined by the equation $$\rho=9.2\times10^{-4}e\frac{5.88\times10^{3}}{T}$$

where $\rho$=the bulk resistivity of the member in ohm-centimeters, and $T$=the absolute temperature of the member in degrees Kelvin.

References Cited in the file of this patent

UNITED STATES PATENTS

| | | |
|---|---|---|
| 2,402,662 | Ohl | June 25, 1946 |
| 2,547,173 | Rittner | Apr. 3, 1951 |

OTHER REFERENCES

Electrical Engineering, December 1949, Conductivity in Semi-Conductors, by Lark-Horovitz, pages 1047–1055.

Electrical Engineering, July 1952, The ABC's of Germanium, by Jordan, pages 619–625.

Physical Review, vol. 91, No. 5, September 1, 1953, Electrical Properties of Gold-Germanium Alloys, by Dunlap, page 1282.

Physical Review, vol. 96, No. 4, November 15, 1954, Properties of Germanium Doped with Iron. I. Electrical Conductivity, by Tyler et al., pages 874–882.